(12) United States Patent
Egashira et al.

(10) Patent No.: US 12,157,487 B2
(45) Date of Patent: Dec. 3, 2024

(54) MONITORING DEVICE, STORAGE MEDIUM STORING COMPUTER PROGRAM FOR MONITORING, AND MONITORING METHOD

(71) Applicant: TOYOTA JIDOSHA KABUSHIKI KAISHA, Toyota (JP)

(72) Inventors: Kazuki Egashira, Tokyo-to (JP); Shunichiroh Sawai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 18/176,117

(22) Filed: Feb. 28, 2023

(65) Prior Publication Data
US 2023/0373508 A1  Nov. 23, 2023

(30) Foreign Application Priority Data
May 17, 2022 (JP) .................................. 2022-080857

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/08* (2013.01); *B60W 40/105* (2013.01);
(Continued)

(58) Field of Classification Search
CPC .... B60W 50/14; B60W 40/08; B60W 40/105; B60W 2040/0818; B60W 2050/0083;
(Continued)

(56) References Cited

U.S. PATENT DOCUMENTS

| 8,184,008 B2 * | 5/2012 | Uozumi ................ B60W 50/14 |
| | | 340/576 |
| 10,919,536 B2 * | 2/2021 | Sim ...................... G06V 20/597 |

(Continued)

FOREIGN PATENT DOCUMENTS

| CN | 117775016 A * | 3/2024 | ............. B60K 35/00 |
| EP | 2143585 A1 * | 1/2010 | ........... B60K 28/066 |

(Continued)

*Primary Examiner* — Eric Blount
(74) *Attorney, Agent, or Firm* — Oliff PLC

(57) ABSTRACT

A monitoring device has a processor configured to detect surrounding objects of specified types present within a predetermined region around a vehicle, decide a level of monitoring of surroundings by a driver, set an inattention threshold to a first value as a reference for the level of monitoring of the surroundings by the driver when the number of surrounding objects is less than an object number threshold, and set the inattention threshold to a second value that is smaller than the first value when the number of surrounding objects is equal to or greater than the object number threshold, determine whether or not the level of monitoring of the surroundings has exceeded the inattention threshold, and give the driver a warning to direct the driver's attention to the vehicle surroundings when the level of monitoring of the surroundings has exceeded the inattention threshold.

10 Claims, 6 Drawing Sheets

(51) Int. Cl.
  *B60W 40/105* (2012.01)
  *B60W 50/00* (2006.01)
(52) U.S. Cl.
  CPC ............... *B60W 2040/0818* (2013.01); *B60W 2050/0083* (2013.01); *B60W 2050/143* (2013.01); *B60W 2050/146* (2013.01); *B60W 2540/229* (2020.02); *B60W 2554/40* (2020.02)
(58) Field of Classification Search
  CPC ..... B60W 2050/143; B60W 2050/146; B60W 2540/229; B60W 2554/40; B60W 2540/225; B60K 28/02
  USPC .......................................................... 340/576
  See application file for complete search history.

(56) References Cited

U.S. PATENT DOCUMENTS 11,978,266 B2 * 5/2024 Arar ...................... B60W 50/14
2013/0073122 A1 * 3/2013 Hoshiya ................. G08G 1/164
  701/2
2019/0236386 A1 * 8/2019 Yu .......................... G08G 1/165
2021/0061287 A1 * 3/2021 Cieslar ................... G06V 40/18
2021/0097408 A1 * 4/2021 Sicconi ................... G06N 20/00
2021/0374443 A1 * 12/2021 Edwards ................ G06V 40/19
2023/0264706 A1 * 8/2023 Yasuda .................. B60K 35/00
  340/435

FOREIGN PATENT DOCUMENTS

| JP | 2009-128486 A | 6/2009 | | |
| JP | 2013-065246 A | 4/2013 | | |
| JP | 2014-095987 A | 5/2014 | | |
| JP | 2014-181020 A | 9/2014 | | |
| WO | WO-2010032491 A1 | * | 3/2010 | ............. A61B 5/048 |
| WO | WO-2020061650 A1 | * | 4/2020 | ............... A61B 5/18 |

* cited by examiner

MONITORING DEVICE, STORAGE MEDIUM STORING COMPUTER PROGRAM FOR MONITORING, AND MONITORING METHOD

FIELD

The present disclosure relates to a monitoring device, a storage medium storing a computer program for monitoring, and a monitoring method.

BACKGROUND

An in-vehicle monitoring device conventionally monitors the state of a driver and monitors whether or not the driver is attentive to surrounding vehicles. For example, a monitoring device mounted in a vehicle monitors whether or not the driver is looking ahead of the vehicle, and alerts the driver if the driver is distracted.

Japanese Unexamined Patent Publication No. 2013-65246, for example, proposes an in-vehicle system that measures the degree of improper driving such as distracted driving (the improper driving level), and gives an alert when the improper driving level reaches a response level. The in-vehicle system lowers the response level in traveling locations where improper driving is likely to occur, compared to traveling locations where it is unlikely to occur. The in-vehicle system can thus help to prevent improper driving.

SUMMARY

As mentioned above, it has been proposed to vary the reference for monitoring the driver depending on whether improper driving is likely to occur in the traveling location. Moving objects such as vehicles or pedestrians can potentially come close to the vehicle. The number of moving objects may also vary dynamically. It may therefore be preferred to vary the reference for monitoring the driver depending on the conditions around the vehicle.

It is an object of the present disclosure to provide a monitoring device that can properly monitor a driver by varying a driver monitoring reference depending on the conditions surrounding the vehicle.

According to one embodiment, the invention provides a monitoring device. The monitoring device has a detecting unit that detects surrounding objects of specified types present within a predetermined region around a vehicle, based on environmental information representing an environment surrounding the vehicle, a deciding unit that decides a level of monitoring of surroundings by a driver of the vehicle, based on information representing a state of the driver, a setting unit that sets an inattention threshold to a first value as a reference for the level of monitoring of the surroundings by the driver when number of the surrounding objects detected within the predetermined region by the detecting unit is less than an object number threshold, and sets the inattention threshold to a second value that is smaller than the first value when the number of the surrounding objects is equal to or greater than the object number threshold, an assessment unit that determines whether or not the level of monitoring of the surroundings by the driver, as decided by the deciding unit, has exceeded the inattention threshold, and a warning unit that gives the driver a warning, via a notification unit, to direct attention to the vehicle surroundings, when it has been determined by the assessment unit that the level of monitoring of the surroundings by the driver has exceeded the inattention threshold.

In the monitoring device, it is preferable that the deciding unit decides the level of monitoring of the surroundings by the driver of the vehicle so that the value is larger with a greater degree of lack of attention of the driver to the vehicle surroundings, and the warning unit gives the driver a warning when it has been determined by the assessment unit that the level of monitoring of the surroundings by the driver is greater than the inattention threshold.

In the monitoring device, it is preferable that the deciding unit also decides the level of monitoring of the surroundings by the driver based on the duration for which the driver is distracted.

In the monitoring device, it is preferable that the deciding unit also decides the level of monitoring of the surroundings by the driver based on the number of times that the driver is distracted within a predetermined time period.

In the monitoring device, it is preferable that the deciding unit also decides the level of monitoring of the surroundings by the driver based on the cumulative time that the driver is distracted within a predetermined time period.

In the monitoring device, it is preferable that the deciding unit decides the level of monitoring of the surroundings by the driver of the vehicle so that the value is larger with a greater degree of attention of the driver to the vehicle surroundings, and the warning unit gives the driver a warning when it has been determined by the assessment unit that the level of monitoring of the surroundings by the driver is smaller than the inattention threshold.

The monitoring device also preferably has a first varying unit that varies the inattention threshold set by the setting unit, based on the relative relationship between the direction in which a surrounding object has been detected by the detecting unit and the direction in which the face of the driver is oriented.

The monitoring device also preferably has a second varying unit that varies the inattention threshold set by the setting unit based on the speed of the vehicle.

According to another embodiment, a non-transitory storage medium storing a computer program for monitoring is provided. The computer program for monitoring causes a processor to execute a process which includes detecting surrounding objects of specified types present within a predetermined region around a vehicle, based on environmental information representing an environment surrounding the vehicle, deciding a level of monitoring of surroundings by a driver of the vehicle, based on information representing a state of the driver, setting an inattention threshold to a first value as a reference for the level of monitoring of the surroundings by the driver when number of the surrounding objects detected within the predetermined region by the detecting unit is less than an object number threshold, and setting the inattention threshold to a second value that is smaller than the first value when the number of the surrounding objects is equal to or greater than the object number threshold, determining whether or not the level of monitoring of the surroundings by the driver has exceeded the inattention threshold, and giving the driver a warning, via a notification unit, to direct attention to the vehicle surroundings, when it has been determined that the level of monitoring of the surroundings by the driver has exceeded the inattention threshold.

According to yet another embodiment of the invention there is provided a monitoring method. The monitoring method is carried out by a monitoring device monitoring device and includes detecting surrounding objects of specified types present within a predetermined region around a vehicle, based on environmental information representing an environment surrounding the vehicle, deciding a level of monitoring of surroundings by a driver of the vehicle, based on information representing a state of the driver, setting an inattention threshold to a first value as a reference for the level of monitoring of the surroundings by the driver when number of the surrounding objects detected within the predetermined region by the detecting unit is less than an object number threshold, and setting the inattention threshold to a second value that is smaller than the first value when the number of the surrounding objects is equal to or greater than the object number threshold, determining whether or not the level of monitoring of the surroundings by the driver has exceeded the inattention threshold, and giving the driver a warning, via a notification unit, to direct attention to the vehicle surroundings, when it has been determined that the level of monitoring of the surroundings by the driver has exceeded the inattention threshold.

The monitoring device of the disclosure can properly monitor a driver by varying the driver monitoring reference depending on the conditions surrounding the vehicle.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1A:
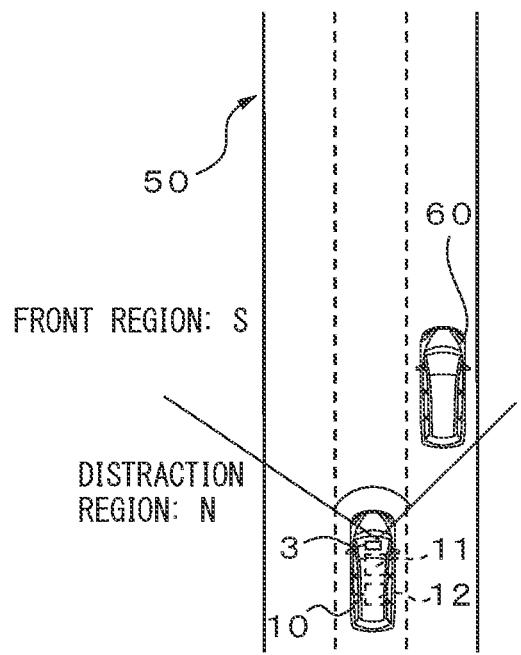
FIG. 1A is a diagram illustrating in overview the operation of a monitoring device according to an embodiment, and showing a state where one other vehicle is traveling around the vehicle.
Figure 1B:
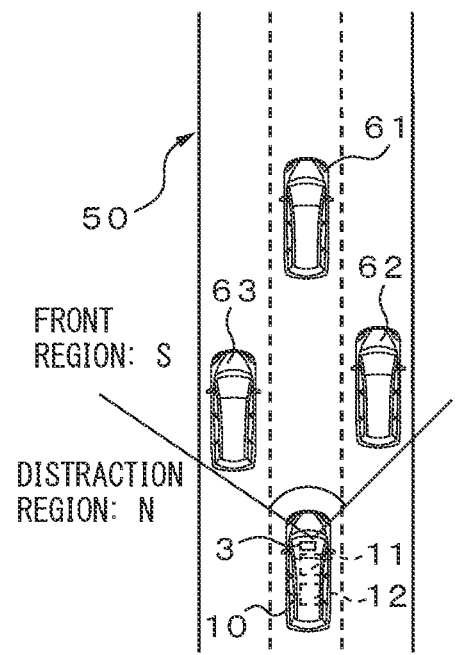
FIG. 1B is a diagram illustrating in overview the operation of a monitoring device according to an embodiment, and showing a state where multiple other vehicles are traveling around the vehicle.
Figure 1C:
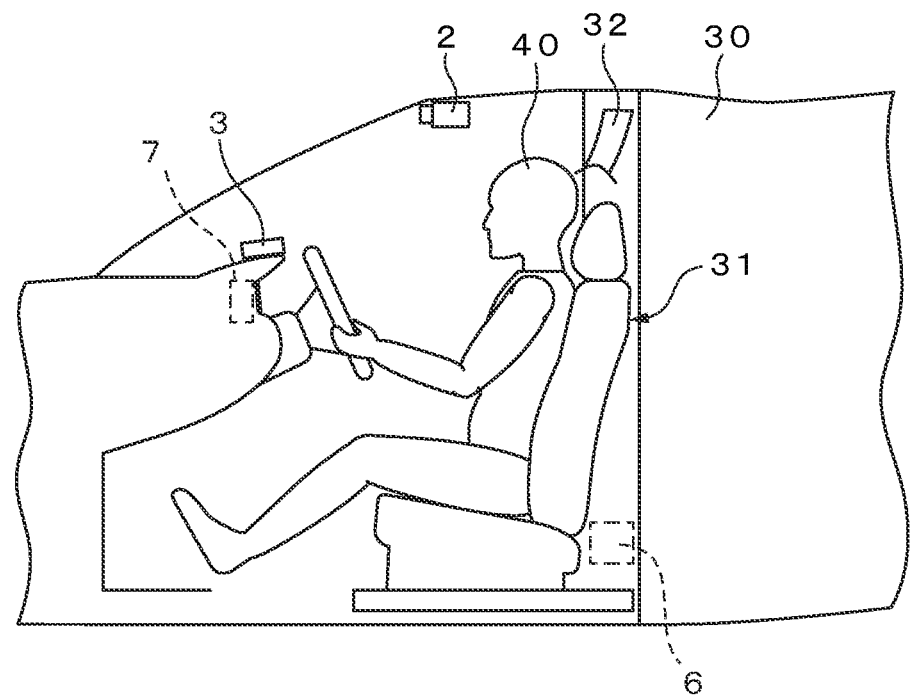
FIG. 1C is a diagram illustrating operation of the monitoring device of the embodiment in overview, and showing the interior compartment.

FIG. 1A to FIG. 1C are diagrams showing operation of a monitoring device 12 according to an embodiment in overview. FIG. 1A is a diagram showing the state of one other vehicle 60 traveling around a vehicle 10, FIG. 1B is a diagram showing the state of multiple other vehicles 61, 62, 63 traveling around the vehicle, and FIG. 1C is a diagram showing the interior of the compartment 30. Operation for monitoring processing whereby the monitoring device 12 monitors the driver as disclosed herein will now be described in overview with reference to FIG. 1A to FIG. 1C.

The vehicle 10 has an object detector 11 and a monitoring device 12. The object detector 11 detects other objects present in the surrounding region ahead of the vehicle 10, using a front camera 2 and a LiDAR sensor 4. The region ahead of the vehicle 10 in which other objects are detected by the front camera 2 and LiDAR sensor 4 (see FIG. 2) is an example of a predetermined region around the vehicle 10. The monitoring device 12 monitors the state of the driver.

In the example shown in FIG. 1A, the vehicle 10 is traveling on a road 50. Another vehicle 60 is traveling in the region ahead of the vehicle 10. The object detector 11 detects another vehicle 60 in the region ahead of the vehicle 10, using the front camera 2 and LiDAR sensor 4.

The monitoring device 12 estimates the orientation of the line of sight of the driver 40 using a monitor image taken by a monitoring camera 3. The monitoring device 12 determines whether the orientation of the line of sight of the driver 40 is within the front region S (non-distraction region) or whether it is within the distraction region N. The front region S is shown as the angle of the predetermined region in the right-left horizontal direction from the front direction, with the driving seat 31 in the compartment 30 as the starting point. The distraction region N is shown as an area with the full angle in the right-left horizontal direction with respect to the front direction, with the driving seat 31 in the compartment 30 as the starting point, excluding the area representing the front region S.

When the orientation of the line of sight of the driver 40 is within the front region S it may be assumed that the driver 40 is monitoring the region ahead of the vehicle 10. When the orientation of the line of sight of the driver 40 is within the distraction region N, however, it may be assumed that the driver 40 is not monitoring the region ahead of the vehicle 10.

The monitoring device 12 therefore determines that the driver is not distracted when the orientation of the line of sight of the driver 40 is within the front region S, and that the driver is distracted when the orientation of the line of sight of the driver 40 is within the distraction region N.

The driver monitoring device 12 decides the degree to which the driver 40 is monitoring the surroundings based on the monitor image. The monitor image is an example of information representing the state of the driver. Specifically, the monitoring device 12 decides the duration for which the driver is distracted, as the level of monitoring of the surroundings by the driver 40.

In the example shown in FIG. 1A, the number of other vehicles 60 (1) detected by the object detector 11 in the region ahead of the vehicle 10 is less than the object number threshold (such as 2), and therefore the monitoring device 12 sets a first value (such as 3 seconds) as the inattention threshold to serve as the reference for falling of the level of monitoring of the surroundings by the driver 40 of the vehicle 10. The other vehicle 60 is an example of a surrounding object of the specified type. The other vehicle 60 may potentially come close to the vehicle 10.

Since the level of monitoring of the surroundings by the driver is not exceeding the inattention threshold, the monitoring device 12 does not give a warning to the driver 40.

In the example shown in FIG. 1B, however, other vehicles 61, 62, 63 are traveling in the region ahead of the vehicle 10. The number of other vehicles 61, 62, 63 (3) detected by the object detector 11 in the region ahead of the vehicle 10 is equal to or greater than the object number threshold (such as 2), and therefore the monitoring device 12 sets a second value that is smaller than the first value, (such as 2 seconds) as the inattention threshold to serve as the reference for falling of the level of monitoring of the surroundings by the driver 40 of the vehicle 10.

When the number of other vehicles detected in the region ahead of the vehicle 10 is greater, it is desirable for the driver 40 be attentive to each of the other vehicles. This requires a higher level of monitoring of the surroundings by the driver 40.

Since the level of monitoring of the surroundings by the driver has exceeded the inattention threshold, the monitoring device 12 gives the driver 40 a warning to direct attention to the front of the vehicle 10, via a user interface (UI) 7. The user interface 7 is an example of a notification unit.

As mentioned above, the monitoring device 12 can properly monitor the driver 40 by varying the reference for monitoring the driver 40 depending on the conditions surrounding the vehicle 10.

Figure 2:
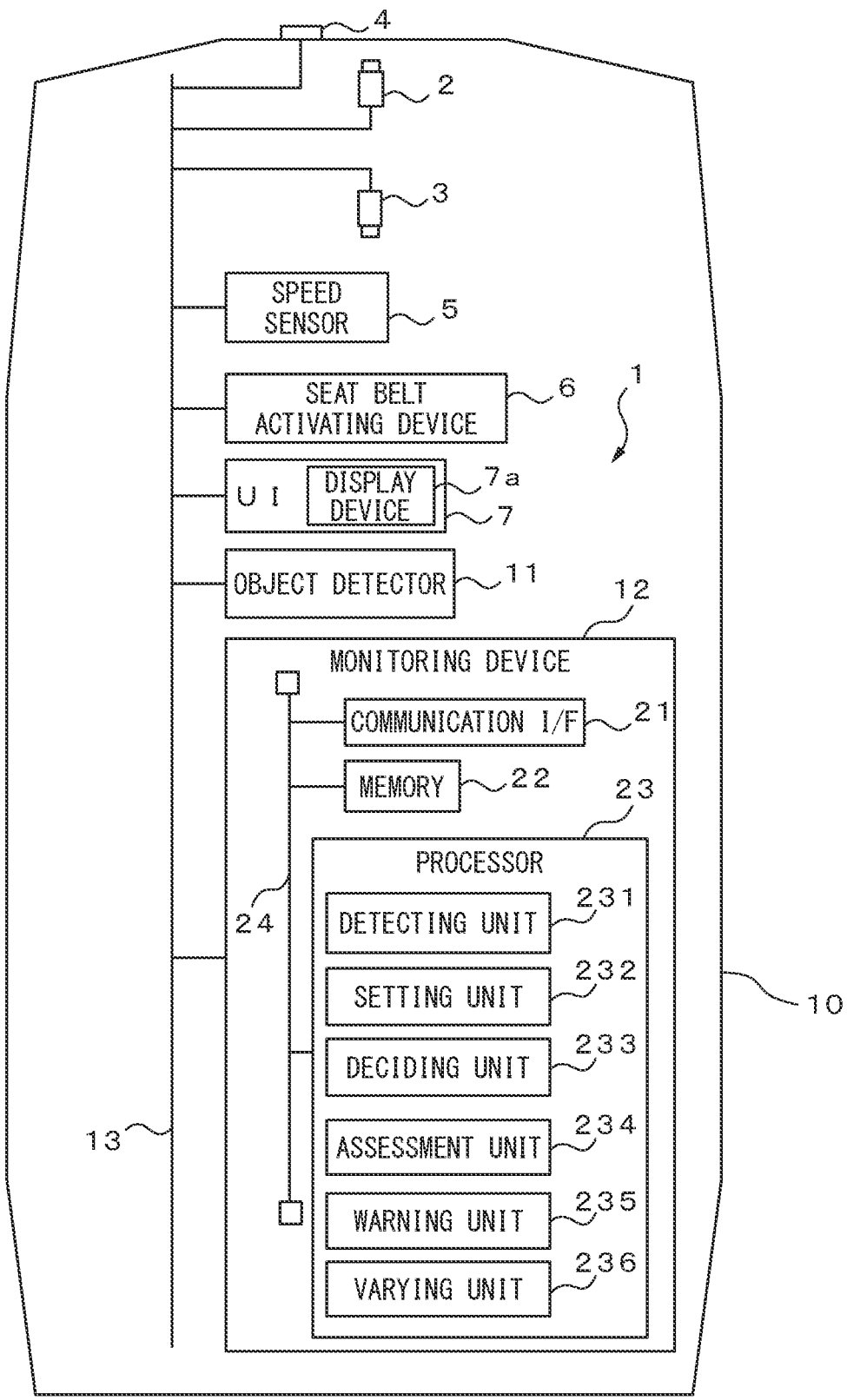
FIG. 2 is a general schematic drawing of a vehicle in which a monitoring system of the embodiment is mounted.

FIG. 2 is a general schematic drawing of a vehicle 10 in which a monitoring system 1 of the embodiment is mounted. The vehicle 10 has a front camera 2, a monitoring camera 3, a LiDAR sensor 4, a speed sensor 5, a seat belt activating device 6, a user interface (UI) 7, an object detector 11 and a monitoring device 12. The monitoring system 1 has at least the monitoring device 12.

The front camera 2, monitoring camera 3, LiDAR sensor 4, speed sensor 5, seat belt activating device 6, user interface (UI) 7, object detector 11 and monitoring device 12 are connected in a communicable manner via an in-vehicle network 13 conforming to the Controller Area Network standard.

The front camera 2 is an example of an imaging unit provided in the vehicle 10. The front camera 2 is mounted inside the vehicle 10 and directed toward the front of the vehicle 10. The front camera 2 takes a camera image in which the environment of a predetermined region ahead of the vehicle 10 is shown, at a camera image photograph time set with a predetermined cycle, for example. The camera image can show the road in the predetermined region ahead of the vehicle 10, and road features such as surface lane marking lines on the road. The camera image is an example of environment information representing the environment surrounding the vehicle 10. The front camera 2 has a 2D detector composed of an array of photoelectric conversion elements with visible light sensitivity, such as a CCD or C-MOS, and an imaging optical system that forms an image of the photographed region on the 2D detector. The visual field of the front camera 2 preferably includes the front region S.

Each time a camera image is taken, the front camera 2 outputs the camera image and the camera image photograph time through the in-vehicle network 13 to the object detector 11. At the object detector 11, etc., the camera image is used for processing to detect other objects surrounding the vehicle 10.

The monitoring camera 3 is disposed in the vehicle compartment 30 in a manner allowing it to photograph monitor images including the area near the driving seat. The monitor image also includes the face of the driver 40 driving the vehicle 10. The monitoring camera 3 is an example of a photographing device that takes monitor images including the face of the driver 40. The monitoring camera 3 may also be disposed on the steering column, room mirror, meter panel or meter hood (not shown), for example.

The monitoring camera 3 takes monitor images at monitor image photograph times set with a predetermined cycle, for example. The monitoring camera 3 has a 2D detector composed of an array of photoelectric conversion elements with infrared sensitivity, such as a CCD or C-MOS, and an imaging optical system that forms an image of the photographed region on the 2D detector. In addition to the 2D detector, the monitoring camera 3 also preferably has a lighting device that can illuminate the driver. The lighting device is an LED (light emitting diode), and for example, it may consist of two near-infrared LEDs situated on either side of the imaging optical system. Illuminating the driver with near-infrared light allows the driver's face to be photographed without causing discomfort for the driver even during low-illuminance periods such as nighttime. Each time a monitor image is taken, the monitoring camera 3 outputs the monitor image and monitor image photograph time to the monitoring device 12, etc. via the in-vehicle network 13.

The LiDAR sensor 4 is mounted on the outer side of the vehicle 10, for example, being directed toward the front of the vehicle 10. The LiDAR sensor 4 emits a scanning laser ahead of the vehicle 10, at a reflected wave information acquisition time set with a predetermined cycle, and receives a reflected wave that has been reflected from a reflector. The time required for the reflected wave to return contains information for the distance between the vehicle 10 and other objects located in the direction in which the laser has been emitted. The area ahead of the vehicle 10 that is scanned by the LiDAR sensor 4 preferably includes the front region S. The LiDAR sensor 4 outputs the reflected wave information that includes the laser emission direction and the time required for the reflected wave to return, together with the reflected wave information acquisition time at which the laser was emitted, through the in-vehicle network 13 to the object detector 11. At the object detector 11, the reflected wave information is used for processing to detect other objects surrounding the vehicle 10. The reflected wave information is an example of environment information representing the environment surrounding the vehicle 10.

The speed sensor 5 acquires speed information representing the speed of the vehicle 10, and outputs the speed information to the monitoring device 12 via the in-vehicle network 13. The speed information represents the rotational speed of the tires (not shown), for example. At the monitoring device 12, the speed information is used to calculate the speed of the vehicle 10.

The seat belt activating device 6 is controlled by the monitoring device 12, for example, and adjusts the tensile force of the seat belt 32 worn by the driver 40. By adjusting the tensile force of the seat belt 32, the monitoring device 12 can give the driver 40 a warning to direct attention to the front of the vehicle 10.

The UI 7 is an example of the notification unit. The UI 7 is controlled by the monitoring device 12 to give the driver 40 a warning to direct attention to the front of the vehicle 10. The UI 7 has a display device 7a such as a liquid crystal display or touch panel, for display of the warning. The UI 7 may also have an acoustic output device (not shown) to notify the driver of the warning. The UI 7 also generates an operation signal in response to operation of the vehicle 10 by the driver. The UI 7 also has a touch panel or operating button, for example, as an input device for inputting operation information from the driver to the vehicle 10. The UI 7 outputs the input operation information to the driver monitoring device 12, etc. via the in-vehicle network 13.

The object detector 11 detects other objects in the front area around the vehicle 10, and their types, based on the camera image. Other objects include moving objects such as pedestrians or other vehicles that are moving around the vehicle 10. The object detector 11 has a classifier that identifies moving objects represented in images when the camera images are input into the classifier, for example. The classifier may use a deep neural network (DNN) that has been trained to detect objects represented in input images, for example. The object detector 11 may also be a classifier other than a DNN. For example, the classifier used by the object detector 11 may be a support vector machine (SVM) that has been trained to output a confidence factor for representation of objects to be detected in the window, with the input being a feature descriptor (such as Histogram of Oriented Gradients, HOG, for example) calculated from a window set in the image. Alternatively, the object detector 11 may detect an object region by template matching between the image and a template in which an object to be detected is represented.

The object detector 11 may also detect other objects in the front area around the vehicle 10 based on reflected wave information. The object detector 11 may also determine the orientation of another object with respect to the vehicle 10 based on the location of the other object in the camera image, and may determine the distance between the other object and the vehicle 10, based on the orientation and on the reflected wave information output by the LiDAR sensor 4. The object detector 11 estimates the location of the other object represented in a vehicle coordinate system with the vehicle as the origin, based on the current location of the vehicle 10, and the distance of the other object from the vehicle 10 and its orientation, for example. The object detector 11 outputs object detection information which includes information representing the types of other objects that were detected (such as pedestrians or vehicles), and information indicating their locations, to the monitoring device 12, etc.

The monitoring device 12 carries out detection processing, setting processing, determination processing, assessment processing, warning processing and variation processing. For this purpose, the monitoring device 12 has a communication interface (IF) 21, a memory 22 and a processor 23. The communication interface 21, memory 22 and processor 23 are connected via signal wires 24. The communication interface 21 has an interface circuit to connect the monitoring device 12 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23.

All or some of the functions of the monitoring device 12 are functional modules driven by a computer program operating on the processor 23, for example. The processor 23 has a detecting unit 231, a setting unit 232, a deciding unit 233, an assessment unit 234, a warning unit 235 and a varying unit 236. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. Operation of the monitoring device 12 will be described in detail below.

The object detector 11 and monitoring device 12 are electronic control units (ECU), for example. For FIG. 2, the monitoring device 12 was described as a separate device, but all or some of the devices may also be constructed as a single device.

Figure 3:
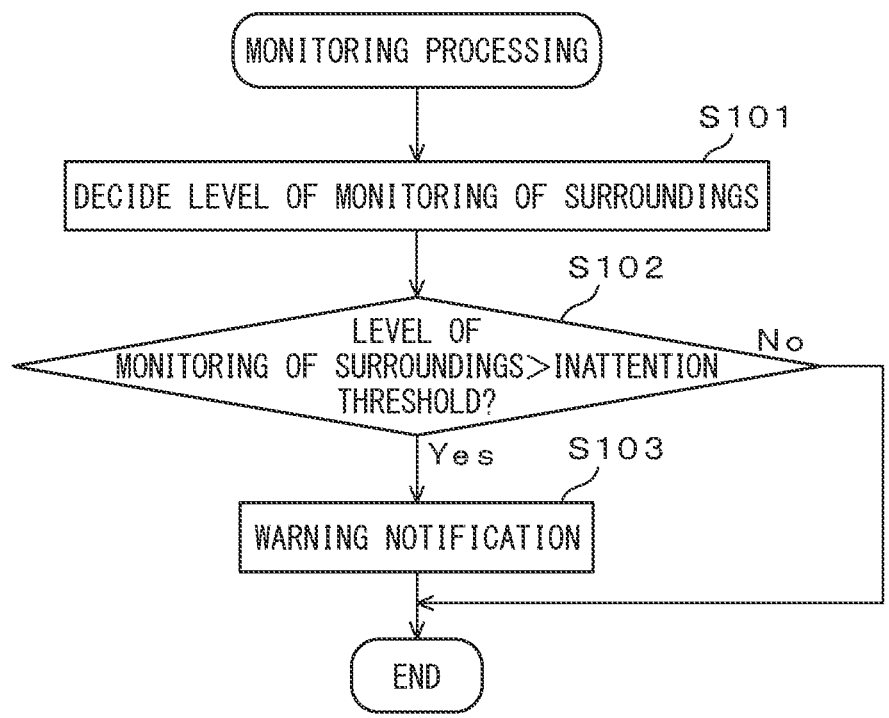
FIG. 3 is an example of an operation flow chart for monitoring processing by the monitoring device of the embodiment.

FIG. 3 is an example of an operation flow chart for monitoring processing by the monitoring device 12 of the embodiment. Monitoring processing by the monitoring device 12 will be described below with reference to FIG. 3. The monitoring device 12 carries out monitoring processing according to the operation flow chart shown in FIG. 3, at a monitoring time at a predetermined cycle.

First, the deciding unit 233 decides the level of monitoring of the surroundings by the driver 40 of the vehicle 10, based on a camera image (step S101). For example, the deciding unit 233 decides the level of monitoring of the surroundings by the driver of the vehicle 10 so that the value is larger with a greater degree of lack of attention by the driver 40 to the surroundings of the vehicle 10. The details regarding processing to determine the level of monitoring of the surroundings by the driver by the deciding unit 233 will be described below.

Next, the assessment unit 234 determines whether or not the level of monitoring of the surroundings by the driver 40 has exceeded the inattention threshold, as the reference for falling of the level of monitoring of the surroundings by the driver 40 (step S102). Threshold setting processing to set the inattention threshold will be described in detail below.

When the level of monitoring of the surroundings by the driver 40 exceeds the inattention threshold (step S102-Yes), the warning unit 235 gives the driver 40 a warning to direct attention to the front of the vehicle 10 via the UI 7 (step S103), and the series of processing steps is complete. The warning may also be displayed using a display device 7a. The warning may also be given by audio using an audio output device in the UI 7. The warning unit 235 can also give the driver 40 a warning to direct attention to the front of the vehicle 10 by periodically varying the tensile force of the seat belt 32 using the seat belt activating device 6. The method of giving the warning is not limited to the above description, and any other method may be used.

If the driver 40 does not direct their line of sight toward the front region S even after a predetermined warning time period, the warning unit 235 may decide to stop the vehicle 10.

When the level of monitoring of the surroundings by the driver has not exceeded the inattention threshold, on the other hand (step S102-No), the series of processing steps is complete.

Processing whereby the deciding unit 233 decides the level of monitoring of the surroundings by the driver will be described below with reference to FIG. 4.

Figure 4:
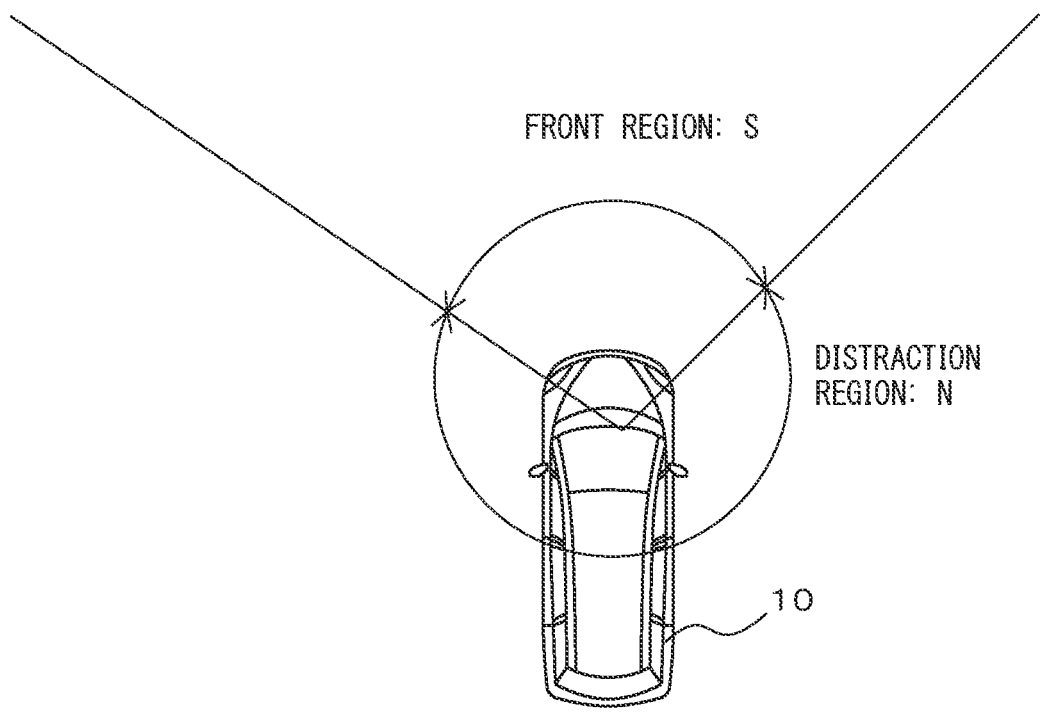
FIG. 4 is a diagram illustrating a front region and a distraction region.

FIG. 4 is a diagram illustrating a front region S and a distraction region N. The front region S is shown as the angle of the predetermined region in the right-left horizontal direction from the front direction, with the driving seat 31 in the compartment 30 as the starting point. The predetermined region in the horizontal direction may be a region from the right edge of the front window of the vehicle 10 toward the left up to ⅔ of the front window, in the front direction with the driving seat 31 in the compartment 30 as the origin, for example. The distraction region N is shown as an area with the full angle in the right-left horizontal direction with respect to the front direction with the driving seat 31 in the compartment 30 as the starting point, excluding the area representing the front region S. The region ahead of the vehicle 10 in which another object is detected by the object detector 11 preferably includes the front region S.

The deciding unit 233 estimates the orientation of the line of sight of the driver 40 using a monitor image taken by the monitoring camera 3. For example, the deciding unit 233 detects the line of sight orientation, based on the monitor image, using the corneal reflex method or eye center method. The orientation of the line of sight of the driver 40 is represented by the angle in the horizontal direction and the angle in the vertical direction, with respect to the front direction of the vehicle 10. The deciding unit 233 estimates the orientation of the line of sight of either the left or right eye of the driver 40. Alternatively, the deciding unit 233 may estimate the orientation of the line of sight of the driver 40 as the average of the line of sight orientations of both eyes of the driver 40.

The deciding unit 233 determines whether the orientation of the line of sight of the driver 40 in the horizontal direction is within the front region S (non-distraction region) or whether it is within the distraction region N. When the orientation of the line of sight of the driver 40 in the horizontal direction is within the front region S it may be assumed that the driver 40 is monitoring the region ahead of the vehicle 10. When the orientation of the line of sight of the driver 40 in the horizontal direction is within the distraction region N, however, it may be assumed that the driver 40 is not monitoring the region ahead of the vehicle 10.

The deciding unit 233 therefore determines that the driver is not distracted when the orientation of the line of sight of the driver 40 in the horizontal direction is within the front region S, and that the driver is distracted when the orientation of the line of sight of the driver 40 in the horizontal direction is within the distraction region N.

The deciding unit 233 also preferably decides the level of monitoring of the surroundings by the driver 40 based on the duration for which the driver 40 is distracted. Specifically, when the driver 40 is distracted, the deciding unit 233 decides the duration for which the driver 40 is distracted as the level of monitoring of the surroundings by the driver 40. The deciding unit 233 calculates the time that the driver 40 has continuously had their line of sight oriented in the distraction region N without looking at the front region S. The duration that the driver 40 is distracted is longer (the value is larger) with a greater degree of lack of attention by the driver 40 to the front of the vehicle 10.

The deciding unit 233 may also decide the level of monitoring of the surroundings by the driver 40 using a different method. For example, the deciding unit 233 may decide the level of monitoring of the surroundings by the driver 40 based on the number of times that the driver 40 is distracted within a predetermined time period. Specifically, the deciding unit 233 may decide the level of monitoring of the surroundings by the driver 40 to be the number of times that the driver 40 is distracted within a predetermined assessment time. The assessment time may be 30 to 60 seconds, for example. The number of times that the driver 40 has been distracted is greater with a greater degree of lack of attention by the driver 40 to the front of the vehicle 10.

Figure 5:
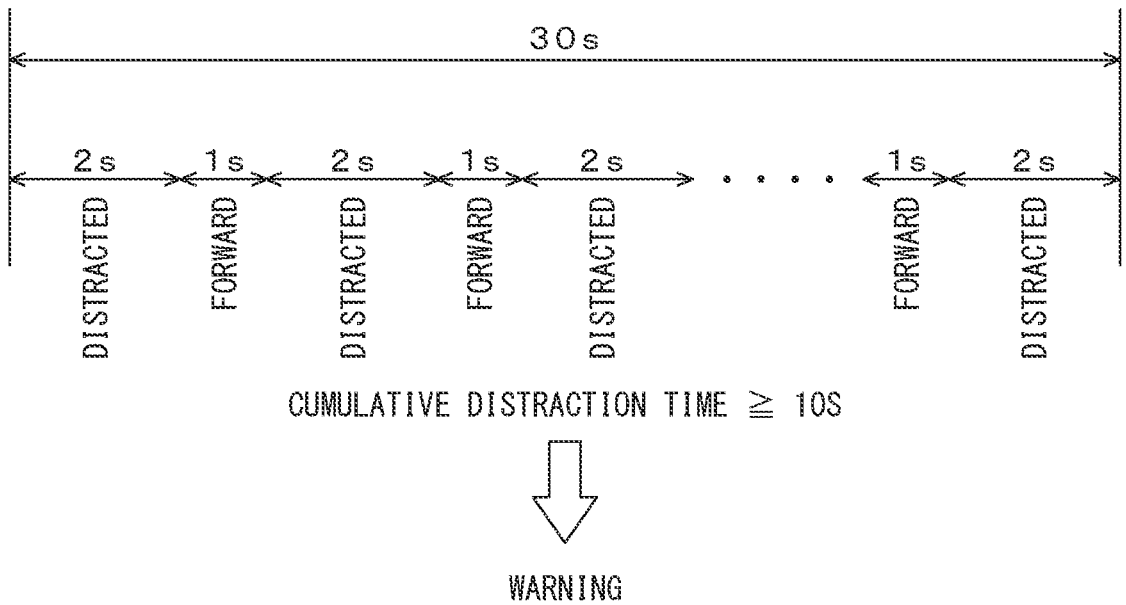
FIG. 5 is a diagram illustrating an example of deciding the level of monitoring of surroundings by a driver.

The deciding unit 233 may also decide the level of monitoring of the surroundings by the driver 40 based on the cumulative time that the driver 40 has been distracted within a predetermined time period. Specifically, the deciding unit 233 may decide the level of monitoring of the surroundings by the driver 40 to be the cumulative time that the driver 40 has been distracted within a predetermined time period. FIG. 5 is a diagram illustrating an example of deciding the level of monitoring of surroundings by a driver 40. The assessment time may be 30 to 60 seconds, for example. The cumulative time that the driver 40 has been distracted within the predetermined time period is longer with a greater degree of lack of attention by the driver 40 to the front of the vehicle 10.

In the example shown in FIG. 5, the driver 40 repeats a cycle of being distracted for 2 seconds, orienting their line of sight forward for 1 second, being distracted for 2 seconds and orienting their line of sight forward for 1 second. Thus, the driver 40 is often distracted intermittently. In terms of the duration for which the driver 40 is distracted, this pattern of distraction by the driver 40 cannot be detected if the inattention threshold is 3 seconds. For this embodiment, therefore, the cumulative time that the driver 40 has been distracted within the predetermined time period is used as the level of monitoring of the surroundings by the driver 40. Any one or more of the aforementioned decision processings for the level of monitoring of the surroundings by the driver may be used.

Figure 6:
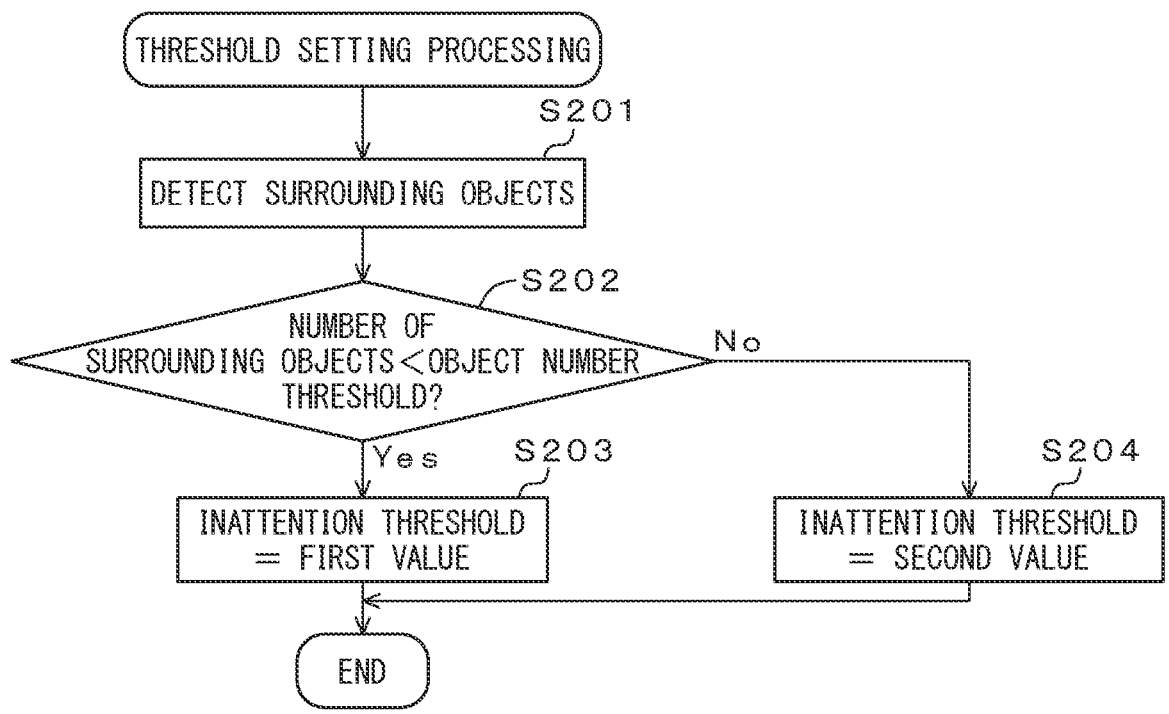
FIG. 6 is an example of an operation flow chart for threshold setting processing by the monitoring device of the embodiment.

Threshold setting processing by which the monitoring device 12 sets the inattention threshold will be described below with reference to FIG. 6. FIG. 6 is an example of an operation flow chart for threshold setting processing by the monitoring device of the embodiment. The monitoring device 12 carries out threshold setting processing according to the operation flow chart shown in FIG. 6, at a threshold setting time with a predetermined cycle. The cycle for the threshold setting time is preferably no longer than the cycle for the monitoring time.

First, the detecting unit 231 detects surrounding objects of specified types present in a predetermined region around the vehicle 10, based on object detection information (step S201). The predetermined region for this embodiment is the front region surrounding the vehicle 10. The surrounding objects of specified types are moving objects. The moving objects may potentially come close to the vehicle 10. Specifically, the moving objects may be other vehicles or pedestrians. The detecting unit 231 detects moving objects located in the region ahead of the vehicle 10 based on the object detection information input from the object detector 11. The detecting unit 231 may also have the function of the object detector 11.

The setting unit 232 determines whether or not the number of surrounding objects detected within the predetermined region around the vehicle 10 is less than the object number threshold (step S202). Specifically, the setting unit 232 determines whether or not the number of other vehicles and pedestrians detected within the region ahead of the vehicle 10 is less than the object number threshold.

The object number threshold may be set according to the number of objects that can normally be given attention in the line of sight of the driver 40. For example, the object number threshold may be set 2 or 3 in the case that the surrounding objects are vehicles or pedestrians. In the case of a single surrounding object it is sufficient for the driver 40 to direct attention to the surrounding object, but if there are two or more surrounding objects it may be difficult for the driver 40 to spread the line of sight. The driver 40 will find it especially more difficult to spread the line of sight when the two surrounding objects are separated by a long distance.

When multiple surrounding objects have been detected, the object number threshold may be varied depending on the minimum adjacent distance between two surrounding objects among the multiple surrounding objects. For example, if the minimum adjacent distance is longer than a predetermined reference distance, then the object number threshold may be reduced compared to when it is shorter than the predetermined reference distance.

When the number of surrounding objects is less than the object number threshold (step S202-Yes), the setting unit 232 sets the inattention threshold to the first value (step S203), and the series of processing steps is complete. When the number of surrounding objects is equal to or greater than the object number threshold (step S202-No), on the other hand, the setting unit 232 sets the inattention threshold to a second value that is smaller than the first value (step S203), and the series of processing steps is complete.

For example, when the level of monitoring of the surroundings by the driver 40 is the duration for which the driver 40 is distracted, the setting unit 232 sets the inattention threshold for the duration for which the driver 40 is distracted. The first value may be 3 seconds and the second value may be 2 seconds, for example.

When the level of monitoring of the surroundings by the driver 40 is the number of times that the driver 40 has been distracted within a predetermined time period, the setting unit 232 sets the inattention threshold for the number of times that the driver 40 has been distracted within the predetermined time period. For example, the first value may be 4 times and the second value may be two times, for the number of times the driver 40 has been distracted within 30 seconds.

When the level of monitoring of the surroundings by the driver 40 is the cumulative time that the driver 40 has been distracted within a predetermined time period, the setting unit 232 sets the inattention threshold for the cumulative time that the driver 40 has been distracted within the predetermined time period. For example, the first value may be 10 seconds and the second value may be 5 seconds, for the cumulative time the driver 40 has been distracted within 30 seconds.

When the number of other vehicles detected in the region ahead of the vehicle 10 is greater, it is desirable for the driver 40 to be attentive to each of the other vehicles. This requires a higher level of monitoring of the surroundings by the driver 40. The monitoring device 12 therefore sets the inattention threshold depending on the number of surrounding objects detected within the predetermined region around the vehicle 10. When the number of surrounding objects is greater, then, the inattention threshold is set so that the driver 40 is more likely to be given a warning than when the number is smaller.

As explained above, the monitoring device of the present embodiment can properly monitor the driver by varying the reference for monitoring the driver depending on the conditions surrounding the vehicle.

A modified example of the monitoring device 12 of this embodiment will now be described with reference to FIG. 7 and FIG. 8.

Figure 7:
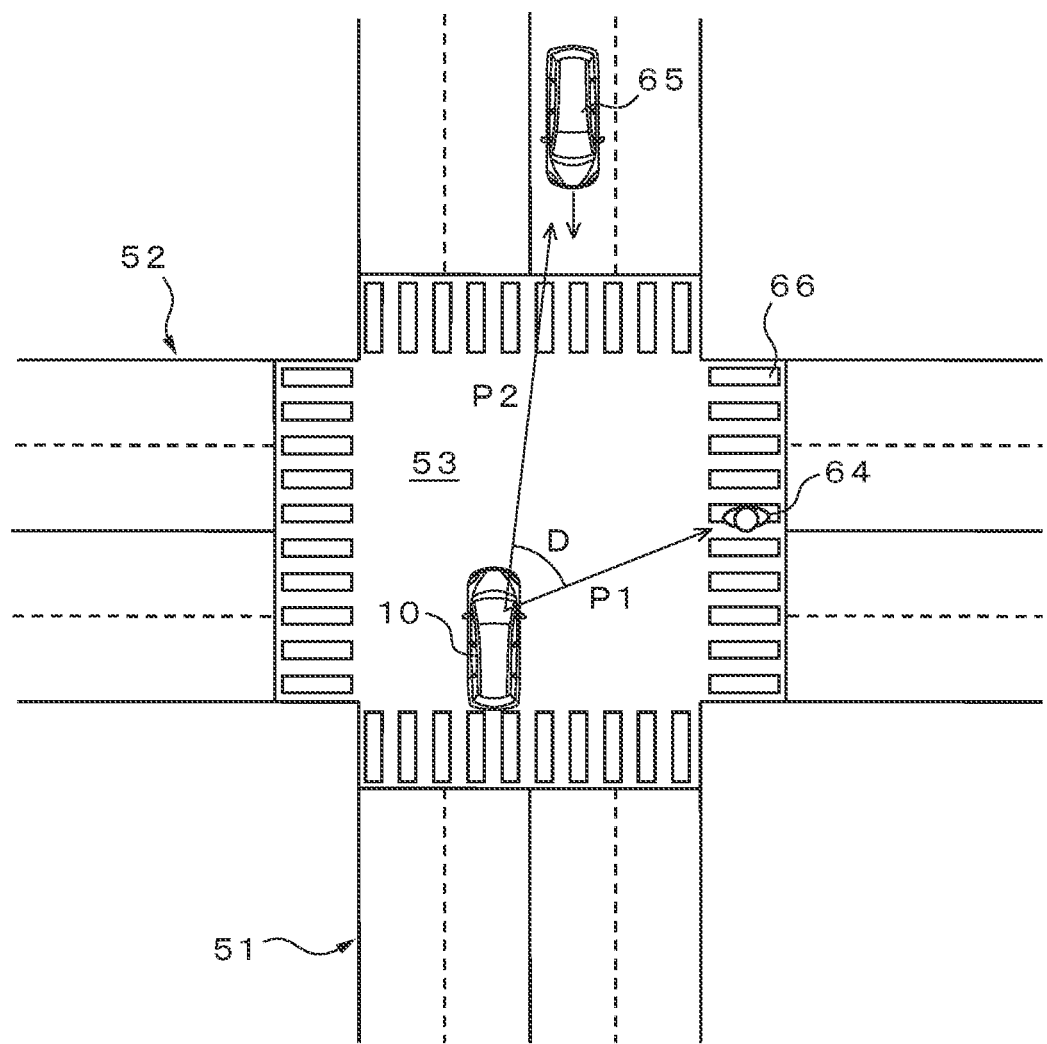
FIG. 7 is a diagram showing Modified Example 1.

FIG. 7 is a diagram showing Modified Example 1. For this modified example, the varying unit 236 varies the inattention threshold set by the setting unit 232, based on the relative relationship between the direction in which a surrounding object has been detected by the detecting unit 231 and the direction in which the face of the driver 40 is oriented.

In the example shown in FIG. 7, the vehicle 10 is attempting to turn right from the road 51 to the road 52, at an intersection 53 where the road 51 and road 52 intersect. The orientation P1 of the line of sight of the driver 40 is directed toward a pedestrian 64 who is walking on a crosswalk 66 of the road 52 in the direction of the right turn. The direction P1 toward which the face of the driver 40 is directed may be the orientation of the line of sight of the driver 40.

Another vehicle 65 is also traveling on the road 51 toward the intersection 53 on the opposite side from the vehicle 10. Since the direction P1 toward which the face of the driver 40 is directed is beyond a predetermined reference angle in the horizontal direction away from the direction P2 in which the other vehicle 65 was detected by the detecting unit 231, the varying unit 236 varies the inattention threshold so that the inattention threshold is smaller than when the direction P1 toward which the face of the driver 40 is directed is equal to or less than the predetermined reference angle with respect to the direction P2 in which the other vehicle 65 was detected. Specifically, when the inattention threshold is the first value, the varying unit 236 sets the inattention threshold to be a third value which is smaller than the first value. When the inattention threshold is the second value, the varying unit 236 sets the inattention threshold to be a fourth value which is smaller than the second value.

Thus, when the direction in which a surrounding object has been detected by the detecting unit 231 and the direction toward which the face of the driver 40 is directed are relatively distant, the monitoring device 12 is more likely to give the driver 40 a warning regardless of the number of surrounding objects.

Figure 8:
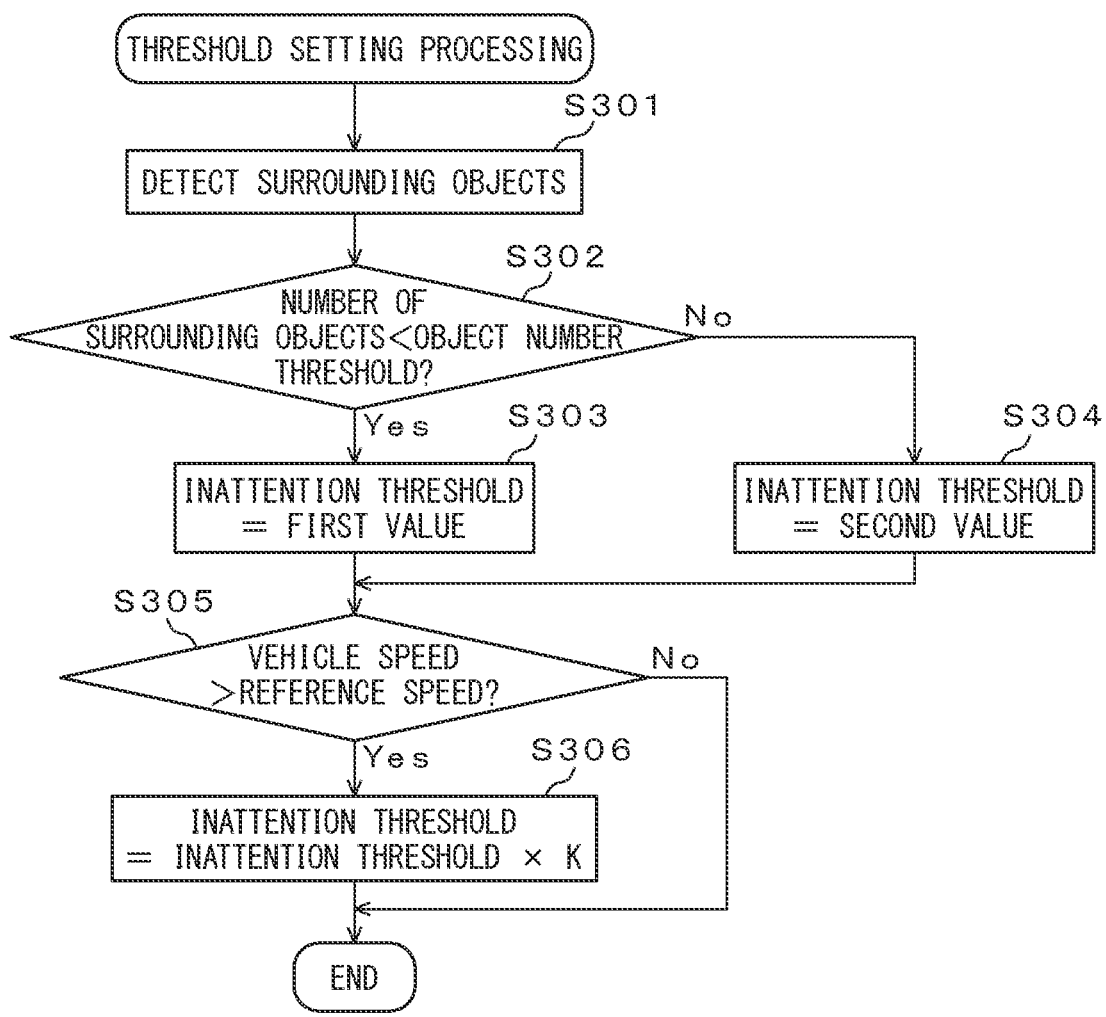
FIG. 8 is an example of an operation flow chart for illustration of Modified Example 2.

FIG. 8 is an example of an operation flow chart for illustration of Modified Example 2. In the threshold setting processing of this modified example, the varying unit 236 varies the inattention threshold set by the setting unit 232, based on the speed of the vehicle 10. The threshold setting processing of this modified example therefore differs from the threshold setting processing described above in that steps S305 and S306 are added. The processing in steps S301 to S304 of the modified example are the same as the processing in steps S101 to S104.

After the inattention threshold has been set to the first value or the inattention threshold has been set to the second value, the setting unit 232 determines whether or not the speed of the vehicle 10 is faster than a predetermined reference speed (step S305).

If the speed of the vehicle 10 is faster than the predetermined reference speed (step S305-Yes), the setting unit 232 sets the inattention threshold so that the inattention threshold is lower than when the speed of the vehicle 10 is equal to or less than the predetermined reference speed (step S306), and the series of processing steps is complete. For example, the setting unit 232 sets the new inattention threshold to be the product of the current inattention threshold and a coefficient K (where K is a positive real number of 1.0 or lower).

When the speed of the vehicle 10 is not faster than the predetermined reference speed (step S305-No), the series of processing steps is complete.

Thus, when the speed of the vehicle 10 is relatively fast and the number of surrounding objects is large, the driver 40 is more likely to be given a warning regardless of the number of surrounding objects.

The monitoring device, computer program for monitoring and monitoring method according to the embodiments described in the present disclosure may incorporate appropriate modifications that still fall within the gist of the disclosure. Moreover, the technical scope of the disclosure is not limited to these embodiments, and includes the invention and its equivalents as laid out in the Claims.

For example, the predetermined region surrounding the vehicle may be a region other than the front of the vehicle. When the vehicle 10 makes a right turn the predetermined region may be the region to the right of the vehicle, when the vehicle 10 makes a left turn the predetermined region may be the region to the left of the vehicle, and when the vehicle 10 is moving backward, the predetermined region may be the region behind the vehicle.

The surrounding objects of specified types present within a predetermined range around the vehicle may also be objects other than moving objects. For example, they may be objects having dimensions smaller than predetermined reference dimensions. Since small objects are more likely to be ignored than large objects, it is helpful to urge the driver to give greater attention to such objects. The dimensions of an object can be estimated based on reflected wave information.

For the embodiments described above, the information representing the state of the driver was a monitor image, but it may also be information other than an image. For example, a pressure sensor installed in the driving seat on which the driver sits may be used to estimate the posture of the driver, and the level of monitoring of the surroundings by the driver may be decided based on the driver posture.

The deciding unit may also decide the level of monitoring of the surroundings by the driver of the vehicle so that the value is larger with a greater degree of attention by the driver to the surroundings of the vehicle. In this case, the warning unit gives the driver a warning when the level of monitoring of the surroundings by the driver has been determined by the assessment unit to be lower than the inattention threshold.

The monitoring device may also monitor states of the driver that are not levels of distraction. For example, the monitoring device may monitor the degree of opening of the eyes or mouth, as an indicator of the level to which the driver is contributing to driving.

The invention claimed is:

1. A monitoring device comprising:
a processor configured to
detect surrounding objects of specified types present within a predetermined region around a vehicle, based on environmental information representing an environment surrounding the vehicle,
decide a level of monitoring of surroundings by a driver of the vehicle, based on information representing a state of the driver,
set an inattention threshold to a first value as a reference for the level of monitoring of the surroundings by the driver when number of the surrounding objects detected within the predetermined region is less than an object number threshold, and set the inattention threshold to a second value that is smaller than the first value when the number of the surrounding objects is equal to or greater than the object number threshold,
determine whether or not the level of monitoring of the surroundings by the driver has exceeded the inattention threshold, and
give the driver a warning, via a notification unit, to direct attention to the vehicle surroundings, when it has been determined that the level of monitoring of the surroundings by the driver has exceeded the inattention threshold.

2. The monitoring device according to claim 1, wherein the processor is further configured to decide the level of monitoring of the surroundings by the driver of the vehicle so that the value is larger with a greater degree of lack of attention of the driver to the vehicle surroundings, and give the driver a warning when it has been determined that the level of monitoring of the surroundings by the driver is greater than the inattention threshold.

3. The monitoring device according to claim 2, wherein the processor is further configured to decide the level of monitoring of the surroundings by the driver based on the duration for which the driver is distracted.

4. The monitoring device according to claim 2, wherein the processor is further configured to decide the level of monitoring of the surroundings by the driver based on the number of times that the driver is distracted within a predetermined time period.

5. The monitoring device according to claim 2, wherein the processor is further configured to decide the level of monitoring of the surroundings by the driver based on the cumulative time that the driver is distracted within a predetermined time period.

6. The monitoring device according to claim 1, wherein the processor is further configured to decide the level of monitoring of the surroundings by the driver of the vehicle so that the value is larger with a greater degree of attention of the driver to the vehicle surroundings, and
give the driver a warning when it has been determined that the level of monitoring of the surroundings by the driver is lower than the inattention threshold.

7. The monitoring device according to claim 1, wherein the processor is further configured to vary the inattention threshold based on the relative relationship between the direction in which a surrounding object has been detected and the direction in which the face of the driver is oriented.

8. The monitoring device according to claim 1, wherein the processor is further configured to vary the inattention threshold based on the speed of the vehicle.

9. A computer-readable, non-transitory storage medium storing a computer program for monitoring, which causes a processor execute a process and the process comprising:
detecting surrounding objects of specified types present within a predetermined region around a vehicle, based on environmental information representing an environment surrounding the vehicle;
deciding a level of monitoring of surroundings by a driver of the vehicle, based on information representing a state of the driver;
setting an inattention threshold to a first value as a reference for the level of monitoring of the surroundings by the driver when number of the surrounding objects detected within the predetermined region by the detecting unit is less than an object number threshold, and setting the inattention threshold to a second value that is smaller than the first value when the number of the surrounding objects is equal to or greater than the object number threshold;
determining whether or not the level of monitoring of the surroundings by the driver has exceeded the inattention threshold; and
giving the driver a warning, via a notification unit, to direct attention to the vehicle surroundings, when it has been determined that the level of monitoring of the surroundings by the driver has exceeded the inattention threshold.

10. A monitoring method for monitoring carried out by a monitoring device, the method comprising:
detecting surrounding objects of specified types present within a predetermined region around a vehicle, based on environmental information representing an environment surrounding the vehicle;
deciding a level of monitoring of surroundings by a driver of the vehicle, based on information representing a state of the driver;
setting an inattention threshold to a first value as a reference for the level of monitoring of the surroundings by the driver when number of the surrounding objects detected within the predetermined region by the detecting unit is less than an object number threshold, and setting the inattention threshold to a second value that is smaller than the first value when the number of the surrounding objects is equal to or greater than the object number threshold;

determining whether or not the level of monitoring of the surroundings by the driver has exceeded the inattention threshold; and giving the driver a warning, via a notification unit, to direct attention to the vehicle surroundings, when it has been determined that the level of monitoring of the surroundings by the driver has exceeded the inattention threshold.

\* \* \* \* \*